(12) United States Patent
Deputy et al.

(10) Patent No.: US 12,277,540 B2
(45) Date of Patent: Apr. 15, 2025

(54) ARTIFICIAL INTELLIGENCE MODEL FOR TAXABILITY CATEGORY MAPPING

(71) Applicant: Vertex, Inc., King of Prussia, PA (US)

(72) Inventors: David Deputy, Wayne, PA (US); P. S. Aravind, Kennett Square, PA (US)

(73) Assignee: VERTEX, INC., King Of Prussia, PA (US)

( * ) Notice: Subject to any disclaimer, the term of this patent is extended or adjusted under 35 U.S.C. 154(b) by 95 days.

(21) Appl. No.: 17/661,722

(22) Filed: May 2, 2022

(65) Prior Publication Data

US 2023/0351359 A1  Nov. 2, 2023

(51) Int. Cl.
| | |
|---|---|
| *G06N 3/08* | (2023.01) |
| *G06F 18/243* | (2023.01) |
| *G06N 3/048* | (2023.01) |
| *G06Q 20/20* | (2012.01) |
| *G06N 3/084* | (2023.01) |

(52) U.S. Cl.
CPC ..... *G06Q 20/207* (2013.01); *G06F 18/24317* (2023.01); *G06N 3/048* (2023.01); *G06N 3/084* (2013.01)

(58) Field of Classification Search
CPC .......... G06N 20/00; G06N 5/04; G06N 20/20; G06N 7/01; G06Q 20/207; G06Q 40/123; G06Q 30/0623; G06F 16/9535
See application file for complete search history.

(56) References Cited

U.S. PATENT DOCUMENTS

| | | | | |
|---|---|---|---|---|
| 9,619,835 | B1 * | 4/2017 | Sarda ................. | G06Q 30/0641 |
| 11,574,240 | B2 * | 2/2023 | Coupe ...................... | G06N 5/02 |
| 11,687,812 | B2 * | 6/2023 | Malhotra ............... | G06N 20/20 |
| | | | | 706/12 |
| 11,710,165 | B2 * | 7/2023 | Wiggs .................... | G06V 20/00 |
| | | | | 705/20 |
| 11,861,667 | B1 * | 1/2024 | Nistor ................ | G06Q 30/0635 |
| 12,061,879 | B1 * | 8/2024 | Janzen ..................... | G06F 16/29 |
| 12,165,219 | B1 * | 12/2024 | Chan .................... | G06Q 20/145 |
| 2012/0016678 | A1 * | 1/2012 | Gruber .................. | G06F 40/279 |
| | | | | 704/E21.001 |

(Continued)

*Primary Examiner* — Florian M Zeender
*Assistant Examiner* — Milena Racic
(74) *Attorney, Agent, or Firm* — Alleman Hall & Tuttle LLP (57) ABSTRACT

A computer system for mapping products to taxability categories includes one or more processors configured to execute, in a run-time inference phase, an artificial intelligence model, a taxability category mapping engine, and a taxability category driver record association engine. The artificial intelligence model is configured to receive product text including a product name and product description associated with a product catalog, and output a predicted tax category for a product associated with the product catalog. The taxability category mapping engine is configured to link a taxability driver to the product. The taxability category driver record association engine is configured to create a taxability category mapping drivers record including the taxability driver that is linked to the product. The predicted tax category output from the artificial intelligence model and the taxability category mapping drivers record are stored in a product taxability record.

20 Claims, 8 Drawing Sheets

(56) References Cited

U.S. PATENT DOCUMENTS

| | | | |
|---|---|---|---|
| 2014/0172652 A1* | 6/2014 | Pobbathi | G06Q 10/087 |
| | | | 705/28 |
| 2019/0129732 A1* | 5/2019 | Sivertson | G06N 7/01 |
| 2020/0019561 A1* | 1/2020 | Doyle | G06F 16/287 |
| 2021/0026823 A1* | 1/2021 | von Rickenbach | ........... |
| | | | G06F 11/0793 |
| 2023/0214892 A1* | 7/2023 | Christian | G06F 9/45558 |
| | | | 705/34 |

* cited by examiner

Table 18:

| PRODUCT | PRODUCT NAME 18A1 | DESCRIPTION 18A2 | PRODUCT CODE 18C | TAXPAYER 18C1 | PARTITION 18C2 |
|---|---|---|---|---|---|
| BAGEL | SAL'S ONION BAGEL | BOILED BAGEL... | S_ONI_BAG | RETAILCONYC | 1 |
| KEYCHAIN | SKYLINE KEYCHAIN | DIE-CUT KEYCHAIN... | DC_SKY_KEY | RETAILCONYC | 1 |
| SHIRT | PIKE PL TSHIRT | COTTON T-SHIRT... | PKPL_SST_MED | RETAILCOSEA | 2 |
| COFFEE | HOUSE ROAST | HOT COFFEE... | HOUSE_HOT_12 | RETAILCOSEA | 2 |
| UMBRELLA | EAZY BROLLY | ONE-STEP OPEN... | EZ_BROL_BLK | RETAILCOSEA | 2 |
| SALMON | AK FILLET | FRESH-CAUGHT... | AK_SAL_FIL | RETAILCOSEA | 2 |

FIG. 5

Table 30:

| PRODUCT | PRODUCT NAME 18A1 | PRODUCT CODE 18C | TAXPAYER 18C1 | PARTITION 18C2 | DRIVER 26 |
|---|---|---|---|---|---|
| BAGEL | SAL'S ONION BAGEL | S_ONI_BAG | RETAILCONYC | 1 | 50 |
| KEYCHAIN | SKYLINE KEYCHAIN | DC_SKY_KEY | RETAILCONYC | 1 | 78 |
| SHIRT | PIKE PL TSHIRT | PKPL_SST_MED | RETAILCOSEA | 2 | 77 |

| PRODUCT | PRODUCT NAME 18A1 | DESCRIPTION 18A2 | PRODUCT CODE 18C | DRIVER 26 | TAX CATEGORY 36 |
|---|---|---|---|---|---|
| BAGEL | SAL'S ONION BAGEL | BOILED BAGEL, TOPPED WITH TOASTED ONIONS, SLICED | S_ONI_BAG | 50 | FOOD |
| KEYCHAIN | SKYLINE KEYCHAIN | DIE-CUT KEYCHAIN, NYC SKYLINE, MULTICOLOR, GLITTER | DC_SKY_KEY | 78 | SOUVENIR |
| SHIRT | PIKE PL TSHIRT | COTTON T-SHIRT, PIKE PLACE MARKET DESIGN, SKY BLUE, SIZE MEDIUM | PKPL_T_MED | 77 | CLOTHING |

FIG. 6

| PROD NAME 18A1 | DESCRIPTION 18A2 | DRIVER 26 | TAX CAT 36 | CONFIDENCE C | STATUS S | FEEDBACK 80 |
|---|---|---|---|---|---|---|
| SAL'S ONION BAGEL | BOILED BAGEL, TOPPED WITH TOASTED ONIONS, SLICED | 50 | FOOD | 68.13% | AWAITING APPROVAL | APPROVE / DISAPPROVE |
| SKYLINE KEYCHAIN | DIE-CUT KEYCHAIN, NYC SKYLINE, MULTICOLOR, GLITTER | 78 | SOUVENIR | 52.25% | AWAITING APPROVAL | APPROVE / DISAPPROVE |
| PIKE PL TSHIRT | COTTON T-SHIRT, PIKE PLACE MARKET DESIGN, SKY BLUE, SIZE MEDIUM | 77 | CLOTHING | 96.87% | AUTO-APPROVED | |

FIG. 7

| TAX CATEGORY 36 | JURISDICTION 84 | EVENT 86 | TAX ATR 90 | TAX RULE 92 | TAX RATE 94 |
|---|---|---|---|---|---|
| FOOD | NEW YORK CITY | SALE | EXEMPT | 150001263 | 0 |
| AUTO SUPPLY | NEW YORK CITY | SALE | TAXABLE | 150001264 | 8.4 |
| CLOTHING | SEATTLE | SALE | TAXABLE | 150001265 | 10.5 |

ARTIFICIAL INTELLIGENCE MODEL FOR TAXABILITY CATEGORY MAPPING

BACKGROUND

Transaction tax engines are used to calculate taxes applicable to transactions for goods and services at locations around the world. To determine tax for a product at a transaction device, the transaction device sends a request for a transaction tax calculation over a computer network such as the Internet to a transaction tax engine provisioned at a cloud server by a cloud service provider. The transaction tax engine returns a tax calculation response to the transaction device. While such an approach offers the convenience of point-of-sale tax calculations, some drawbacks exist. For example, it may require large amounts of time and money for a company to manually map its products to a tax category. With tax rates and rules in various jurisdictions being complicated and ever-changing, it can be challenging to efficiently and accurately map a product to the appropriate tax category. Additionally, inaccurately mapping a product to a tax category could result in an error in the tax calculation. This could lead to a loss of profit for the company if the customer is charged too low of a tax rate at the time of the transaction, as the company may be responsible for paying the outstanding tax amount and may be assessed a fine by the jurisdiction if the error is discovered. Further, when the error in tax calculation results in overcharging a customer, the company may face legal liability.

SUMMARY

To address the above issues, a computer system for mapping products to taxability categories is provided. The computer system has server-side and client-side aspects. According to one aspect, the computer system includes one or more processors configured to execute, in a run-time inference phase, an artificial intelligence model, a taxability category mapping engine, and a taxability category driver record association engine. The artificial intelligence model is configured to receive as run-time input product text including a product name and product description associated with a product catalog, and output a run-time output including a predicted tax category for a product associated with the product catalog. The taxability category mapping engine is configured to link a taxability driver to the product. The taxability category driver record association engine is configured to create a taxability category mapping drivers record associating the taxability driver that is linked to the product to a taxability category. The predicted tax category output from the artificial intelligence model and the taxability category mapping drivers record are stored in a product taxability record. Other aspects of the system are described below.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
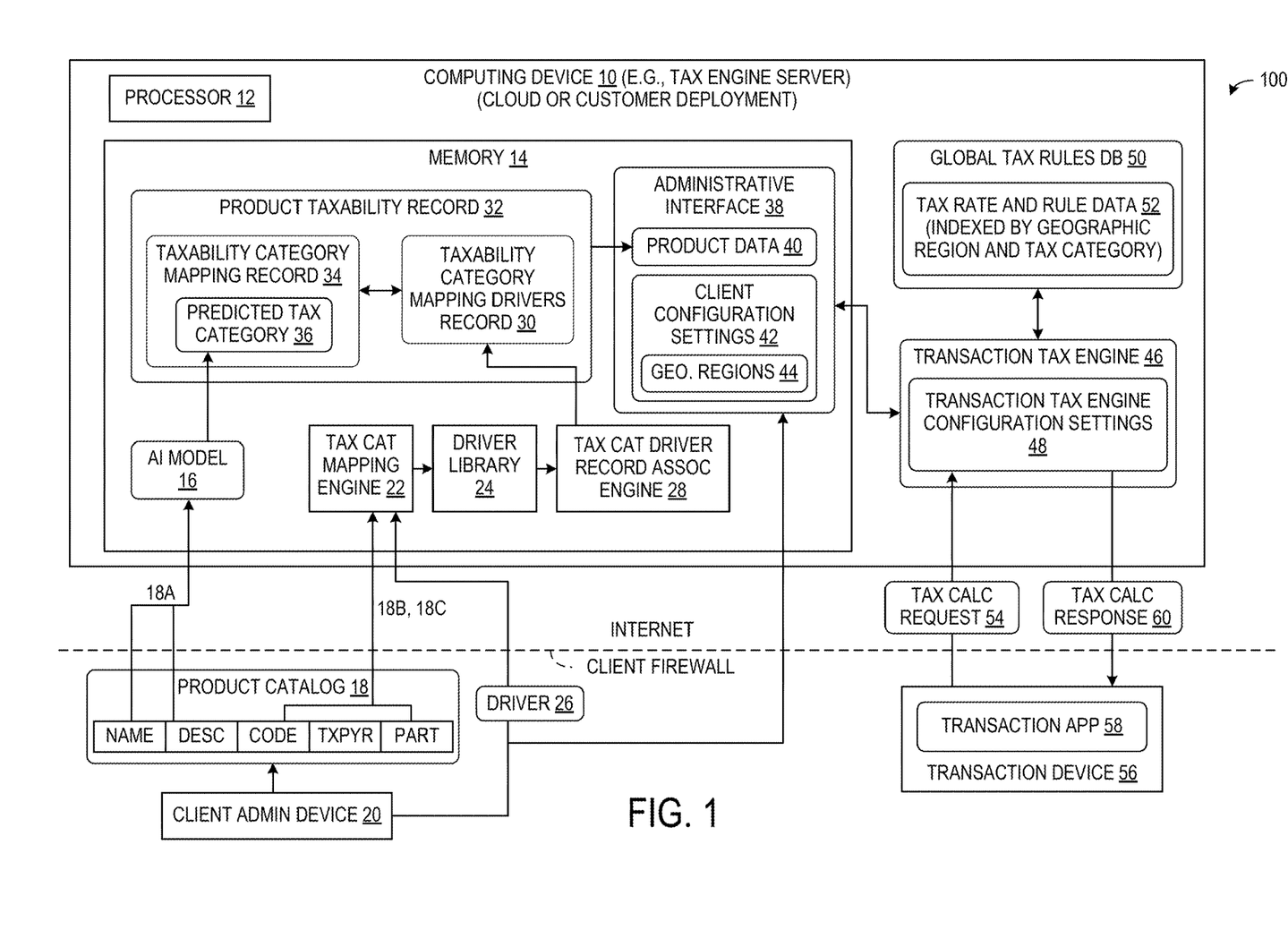
FIG. 1 is a general schematic diagram of a computing system for mapping products to taxability categories according to an embodiment of the present disclosure.

As schematically illustrated in FIG. 1, to address the above identified issues, a computing system 100 for mapping products to taxability categories is provided. The computing system 100 includes a computing device 10, which may, for example, take the form of a tax engine server hosted in a data center of a tax platform operator, for example. Alternatively, the computing device 10 may be configured by the tax platform operator to be hosted at a client-specified data center under control of the client, for performance, security, privacy, and/or export compliance reasons, for example. The computing device 10 includes one or more processors 12 and associated memory 14. The one or more processors 12 is configured to execute instructions using portions of the associated memory 14 to implement an artificial intelligence (AI) model 16 that predicts a tax category for a product. It will be appreciated that the product may be one of tangible and intangible products and service offerings, e.g., both goods and services that may be subject to transaction taxes, such as sales and use tax, lodging and occupancy tax, and the like. It will be further appreciated that a tax category is a parameter that represents groupings of items with like taxation.

As described in detail below with reference to FIG. 3, the tax category AI model 16 is configured to receive, as run-time input, product text 18A from a product catalog 18 associated with the product. The product text 18A may include a product name 18A1 and product description 18A2 included in a product catalog 18, examples of which are described below with reference to FIG. 4. The product text 18A is uploaded to the computing device 10 from a client via a client administrative device 20. The product catalog 18 further includes a product code 18B and taxpayer data 18C related to the product, i.e. a taxpayer code 18C1 and a taxpayer partition 18C2. The taxpayer partition 18C2 enables the client to access different AI models and/or define multiple divisions within the company, such as jurisdictions, for example. A taxability category mapping engine 22 included in the computing device 10 is configured to receive the product code 18B and taxpayer data 18C. The taxability category mapping engine 22 is configured to link a taxability driver 26 to the product. The taxability driver 26 may be uploaded by the client, separately from the product catalog 18. Additionally or alternatively, previously uploaded taxability drivers 26 may be stored in a taxability driver library 24 and retrieved from an associated application programming interface (API) located in the cloud.

The computing device 10 further includes a taxability category driver record association engine 28. Once the taxability driver 26 is linked to the product, the taxability category driver record association engine 28 associates the taxability driver with a tax category and creates a taxability category mapping drivers record 30 for the product that is included in a product taxability record 32. The product taxability record 32 further includes a taxability category mapping record 34 which is associated with the predicted tax category 36 for the product output by the tax category AI model 16 and the taxability category mapping drivers record 30. The taxability categories 36 are predefined groups that help determine the selection of one or more tax rule based on the product and the geographic region in which the transaction occurs. Examples of the taxability category mapping drivers record 30 and the taxability category mapping record 34 are shown below with reference to FIGS. 5 and 6, respectively.

In some implementations, taxability driver records, taxability category mapping driver records, taxability category mapping records, and taxability category records may be uploaded by the client. These records provide information regarding existing taxability drivers and existing taxability mapping, thereby allowing the system to filter out products that are already mapped to a taxability category, filter out products that don't have a corresponding taxability driver, and determine a range of taxability categories most likely to be mapped to the client's products.

The product taxability record 32 is output to an administrative interface 38 and stored as product data 40. The client may utilize the client administrative device 20 to access the administrative interface 38 of the computing device 10 and upload client configuration settings 42 to the computing device 10. The client configuration settings 42 may include, for example, a client-specified subset of geographic regions 44 in which transactions take place or that govern the transactions due to the location at which they are legally deemed to take place (in the case of an online transaction, for example), which have been selected from among a global list of geographic regions stored at the computing device 10. The client configuration settings 42 may further include information on tax exemptions in rule and rate data that apply to transactions.

The product data 40, including the product taxability record 32, and the client configuration settings 42 are received by a transaction tax engine 46 included in the computing device 10. Transaction tax engine configuration settings 48, including the taxability driver 26 and predicted tax category 36, are extracted from the product taxability record 32 and the client configuration settings 42. The transaction tax engine 46 is in communication with an associated global tax rules database 50 included in the computing device 10. The global tax rules database 50 includes tax rate and rule data 52, such tax rates and rules to be applied to products in different tax categories and multiple geographic regions for a global list of geographic regions and a global list of tax categories, for example. The tax rates and rules can be indexed by geographic region, tax category, and other related indexes.

The transaction tax engine 46 is configured to receive a tax calculation request 54 from a transaction device 56 processing a transaction for the product. The transaction device 56 may be implemented as a customer computing device, a point-of-sale terminal, or another computing device suitable for executing a transaction application 58, such as a shopping cart application for an e-commerce site, a point-of-sale terminal application, or other transaction software, for example. Upon receiving the tax calculation request 54, the transaction tax engine 46 is configured to process the tax calculation request 54 according to the transaction tax engine configuration settings 48 and the tax rate and rule data 52, and transmit a tax calculation response 60 to the transaction device 56, such that the correct tax amount is included in the price of the product and the transaction for the product may be completed. This is accomplished using the driver architecture discussed above, as the transaction tax engine 46 filters the tax rate and rule data 52 according to the predicted tax category 36 associated to the taxability driver 26 that is linked to the product and included in the transaction tax engine configuration settings 48.

The global tax rules database 50 and transaction tax engine 46 require significant memory requirements due to their large size, require deployment on servers that are scalable to address spikes in demand, and require continuous updating as the tax rules of the various geographic regions around the world change. For these reasons, the computing device 10 is often centrally hosted in a data center of a cloud computing service that offers its platform as a service. However, in some implementations, the computing device 10 may utilize containerization, deployment, and management of a compact and client-localized version of the transaction tax engine 46 at the client administration device 20. It will be appreciated that the computing device 10, the client administrative device 20, and the transaction device 56 are configured to communicate over a network, with client administrative device 20 and the transaction device 56 behind a client firewall to control traffic between the internet and the client administrative device 20 and the transaction device 56.

Figure 2:
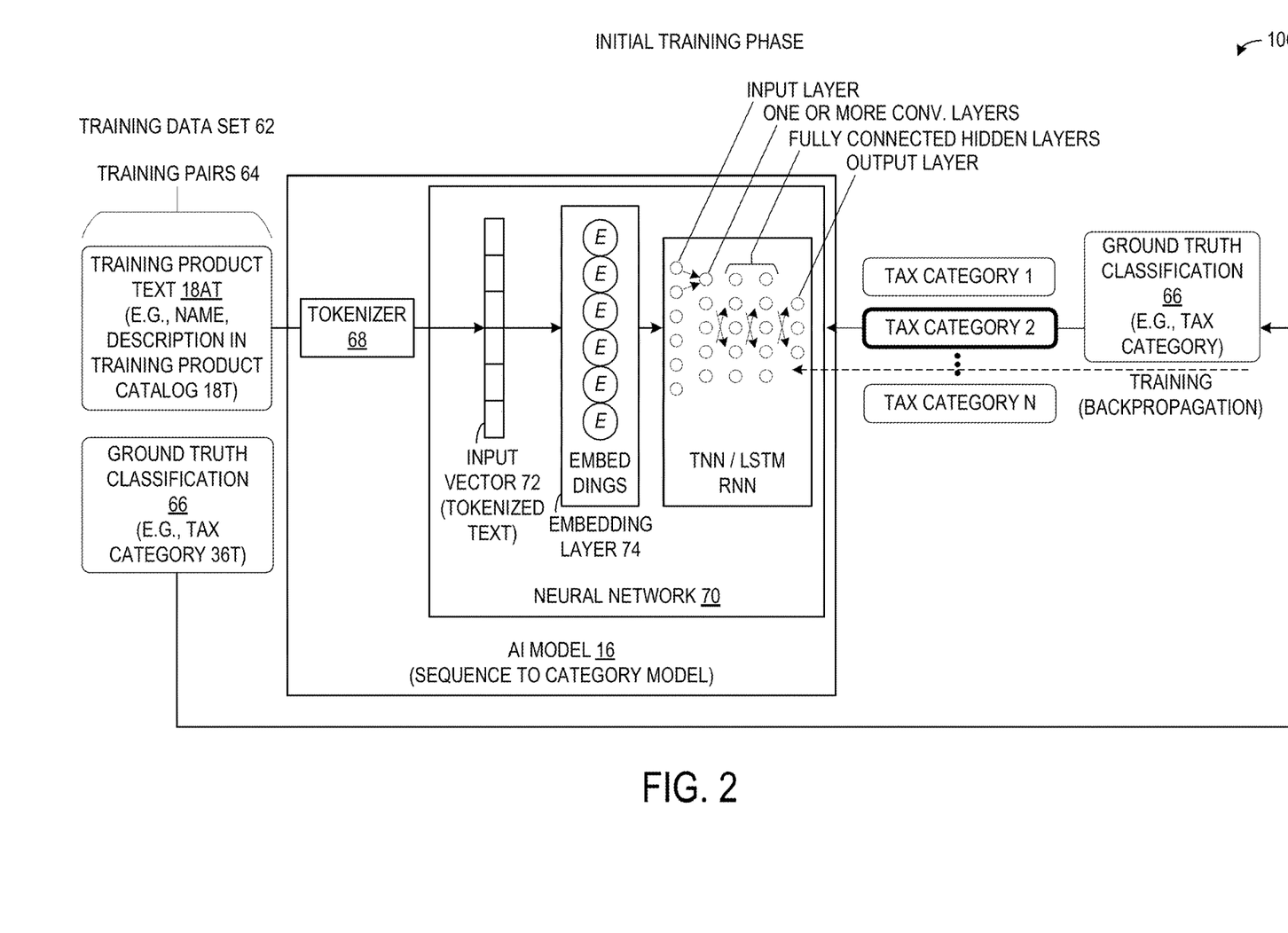
FIG. 2 is a schematic diagram of a tax category artificial intelligence model of the computing system of FIG. 1 during an initial training phase.

FIG. 2 shows a schematic diagram of the tax category AI model 16 during an initial training phase. In the initial training phase, the tax category AI model 16 is trained with a training data set 62 including a plurality of training data pairs 64 from a plurality of training product catalogs 18T. Each training data pair 64 includes training product text 18AT, including a product name and a product description for a product associated with a training product catalog 18T, and a ground truth classification 66 indicating a tax category 36T for the product associated with the training product catalog 18T.

The tax category AI model 16 may be configured as a sequence-to-category AI model, in which the input is a sequence of text or tokenized text, and the output is a single category. To this end, the tax category AI model 16 further includes a tokenizer 68. The tokenizer 68 is configured to tokenize the training product text 18AT to produce a set of tokenized text, which includes a sequence of tokens representing the words in the product name and product description for the product included in the training product text 18AT. Examples of suitable tokenizers include BlazingText, Word2Vec, WordPiece, etc.

The tax category AI model 16 further includes a neural network 70 configured to receive the tokenized text as an input vector 72. The neural network 70 may have an input layer, one or more convolutional layers, one or more fully connected hidden layers, and an output layer. It will be appreciated that the neural network 70 may be configured to include one or more convolutional layers, one or more fully connected hidden layers, or both one or more convolutional layers and one or more fully connected hidden layers. The input layer includes a plurality of nodes corresponding to the training phase product text 18AT. The output layer includes a plurality of output nodes corresponding to the ground truth classification 66, which indicates a training phase tax category 36T for the training data pair 64. Nodes in each layer are linked by weighted associations, and the tax category AI model 16 is configured to adjust internal weights to enhance one or more of the plurality of tokens in the sequence via a backpropagation algorithm according to a loss function during training to increase the accuracy of the output nodes during run-time.

In some implementations, the neural network 70 may be a transformer neural network (TNN). The TNN may be a sequence classifier that is configures to receive a sequence of tokens in the tokenized text and output a classification for the sequence of tokens. In this implementation, the neural network 70 has been pretrained to compute embeddings E for the input vector 72, i.e., tokenized text, via one or more embedding layers 74. The TNN is configured to compute attention weights for each of the embeddings E. In this way, it functions as an attention encoder. A classification layer is provided as an output layer for the TNN and includes a plurality of classifications, such as Tax Category 1, Tax Category 2, and so on. The final layer of the TNN is fully connected to the classification layer.

Alternatively, the neural network may be a long short-term memory (LSTM) recurrent neural network (RNN), which is also configured as a sequence classifier that receives a sequence of tokens in the tokenized text and outputs a classification for the sequence of tokens. In this implementation, an embedding technique such as Word2Vec can be used to create embeddings E in the embedding layer 74 for each token in the sequence of tokens provided as the input vector 72. The LSTM RNN has input, convolutional, and fully connected layers, the last of which is fully connected to each output node in the classification layer. To train the LSTM RNN, a suitable training algorithm such as backpropagation may be used to adjust the weights of the LSTM RNN for each ground truth classification and training product text 18AT that are input to the tax category AI model 16.

Figure 3:
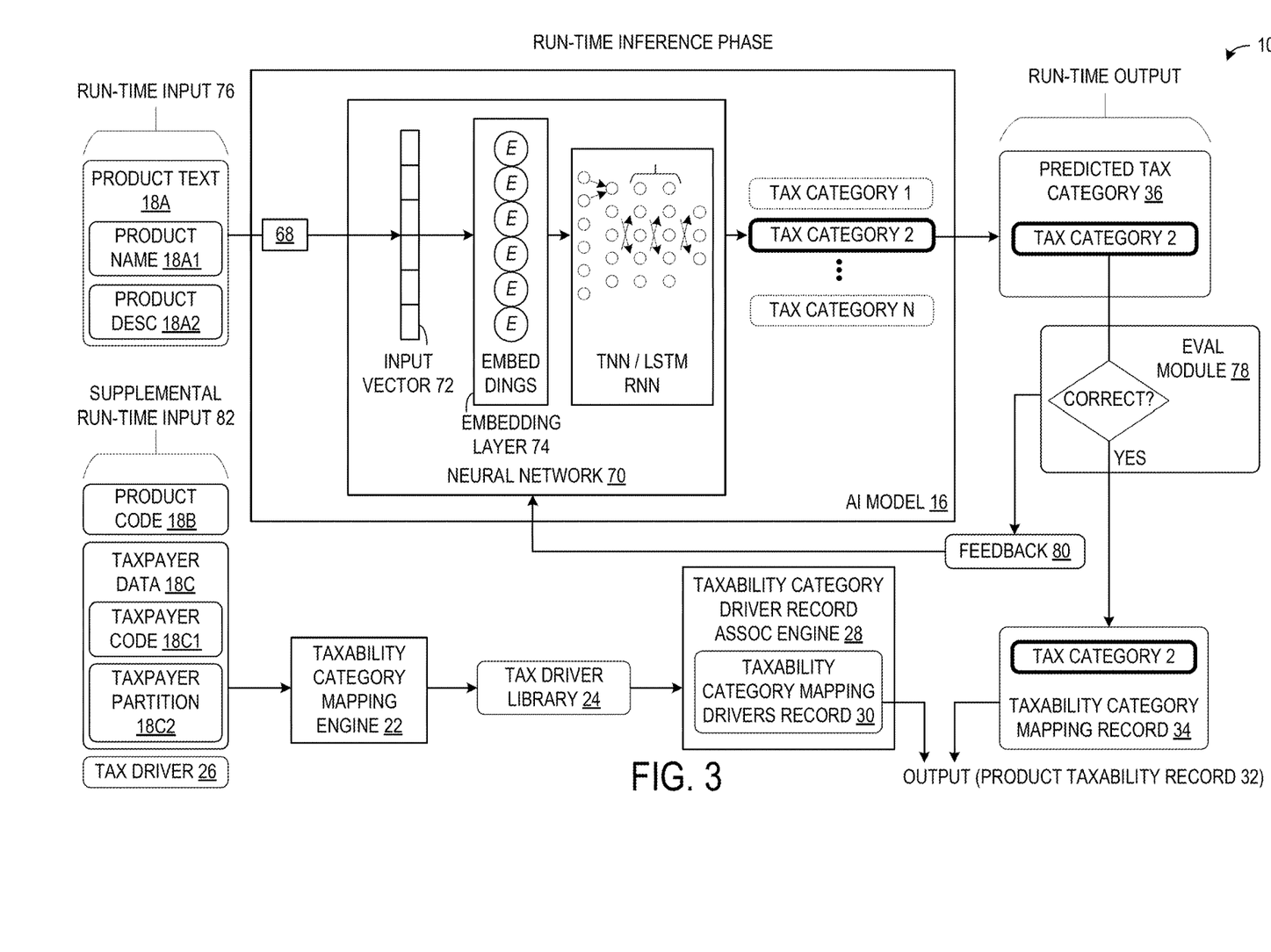
FIG. 3 is a schematic diagram of a tax category artificial intelligence model of the computing system of FIG. 1 during a run-time inference phase.

A schematic diagram of the tax category AI model 16 during a run-time inference phase is illustrated in FIG. 3. As indicated above, the tax category AI model 16 is configured to receive, as run-time input 76, product text 18A including a product name 18A1 and product description 18A2 for a product associated with the product catalog 18. It will be appreciated that the run-time input 76 may be product text 18A associated with a single product catalog 18 or a batch of product catalogs 18. The product text 18A is tokenized to produce a set of tokenized text, including a sequence of tokens representing the words in the product name 18A1 and product description 18A2. The tokenized text is received by the neural network 70 as the input vector 72. Embeddings E are created in the embedding layer 74 for each token in the input vector 72. The embeddings E are processed through the nodes of the neural network 70, which can be implemented as a TNN or an LSTM RNN, for example, and a predicted tax category 36 for the product is output from the classification layer.

In some implementations, the predicted tax category 36 may be displayed by an evaluation module 78 that is executed by the processor 12. The evaluation module 78 may take the form of a graphical user interface (GUI) that is displayed on the client administrative device 20 when the predicted tax category 36 is output, for example. The GUI may be configured to receive a user input indicating that the predicted tax category 36 is correct prior to adopting the predicted tax category 36 for usage in the transaction tax engine 46. When the user confirms that the predicted tax category 36 is correct, the predicted tax category 36 is included in the taxability category mapping record 34.

The computing device 10 may be configured to collect the user input indicating whether the predicted tax category 36 is correct as user feedback 80. The feedback 80 may be collected via an implicit user feedback interface or an explicit user interface, such as the evaluation module 78, for example, and perform feedback training of the tax category AI model 16 based at least in part on the user feedback 80. As an example, explicit feedback may be collected via a selector in taxability category mappings editor, as discussed below with reference to the example explicit feedback shown in FIG. 7. An example of implicit feedback is instrumentation collecting data regarding whether the client adopted or rejected the predicted classification for use in the transaction tax engine 46 at run-time, for example.

Concurrent with the run-time input 76 received by the tax category AI model 16, the taxability category mapping engine 22 is configured to receive the product code 18B and taxpayer data 18C as supplemental run-time input 82 when the product catalog 18 is uploaded from the client administrative device 20. The supplemental run-time input 82 may include the taxability driver 16. As described above, the taxability category mapping engine 22 links the taxability driver 26 to the product. The taxability category mapping drivers record 30 is created for the product by the taxability category driver record association engine 28.

The taxability mapping record 34, including the predicted tax category 36, derived from the run-time input 76 and the taxability category mapping drivers record 30 derived from the supplemental run-time input 82 are included in the product taxability record 32 and output. As described above, the product taxability record 32 is output to the administrative interface 38 as product data 40, and the product data 40 and the client configuration settings 42 are communicated to a transaction tax engine 46 where they are stored as transaction tax engine configuration settings 48. The transaction tax engine 46 is in communication with an associated global tax rules database 50 that includes tax rate and rule data 52. Upon receiving a tax calculation request 54 from the transaction device 56, the transaction tax engine 46 is configured to process the tax calculation request 54 according to the transaction tax engine configuration settings 48 and the tax rate and rule data 52, and return a tax calculation response 60 to the transaction device 56.

Figure 4:
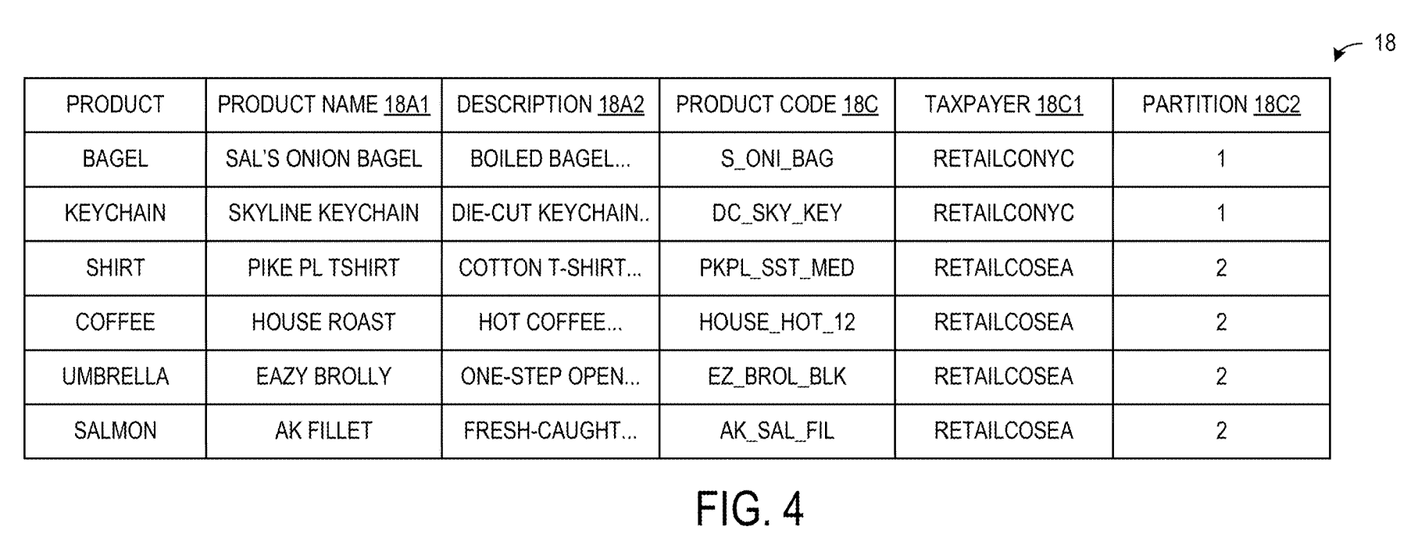
FIG. 4 shows example product catalogs uploaded to the computing system of FIG. 1.

FIG. 4 shows example product catalogs 18 for an example client RetailCo. Each product catalog 18 includes a product name 18A1 and product description 18A2 for a product associated with the respective product catalog. As described above, the product name and description are examples of product text 18A that is received by the tax category AI model 16 at run-time. The product catalog 18 further includes a product code 18B and taxpayer data 18C related to the product, i.e. a taxpayer code and a taxpayer partition, which are received by the taxability category mapping engine 22. In this example, RetailCo has two taxpayer entities, i.e., taxpayer codes 18C1: RetailCoNYC, with transactions taking place in New York City, and RetailCo-SEA with transactions taking place in the city of Seattle. Accordingly, each product catalog 18 includes a partition according to the location of the associated taxpayer entity.

Figure 5:
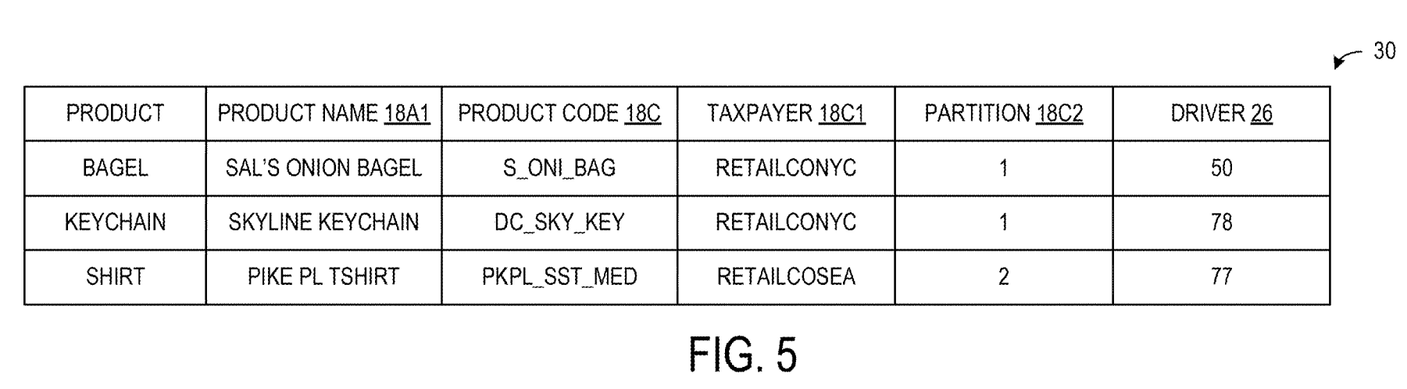
FIG. 5 shows example taxability drivers for products associated with the product catalogs in FIG. 4.

FIG. 5 shows example taxability drivers for a subset of products associated with the product catalogs in FIG. 4. The taxability category mapping engine 22 is configured to link a taxability driver 26 to the product based on the product code 18B and taxpayer data 18C. As described above, the taxability category mapping engine 22 is configured to link taxability driver 26 to the product. The taxability driver 26 may be uploaded by the client. Additionally or alternatively, previously uploaded taxability drivers 26 may be stored in a taxability driver library 24 and retrieved from an associated API located in the cloud.

As described above and shown in FIG. 6, a taxability category mapping record 34 is created for each product according to the respective taxability driver 26 linked to the product and a predicted tax category 36 for the product output by the tax category AI model 16. In the RetailCo example, the product bagel is mapped to the tax category 36 of food, the product keychain is mapped to the tax category 36 of souvenir, and the product shirt is mapped to the tax category 36 of clothing. While the taxability drivers 26 may be defined and uploaded by the client, it will be appreciated that the tax categories 36 are defined by the system 100 and may be used for indexing the tax rate and rule data 52.

Figure 7:
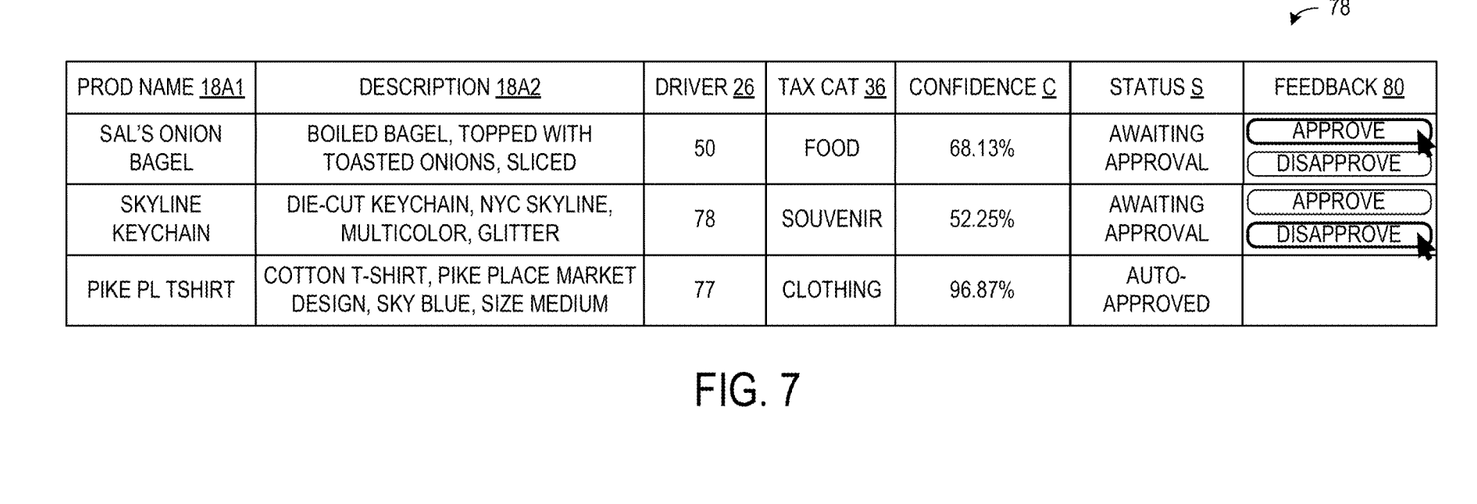
FIG. 7 shows example explicit user feedback for the tax category artificial intelligence model of the computing system of FIG. 1.

The evaluation module 78 may be configured as an explicit user interface by which the client may provide user feedback 80 regarding the accuracy of the tax category mapping. As discussed above and shown in FIG. 7, the evaluation module 78 may be presented to the client as a graphical user interface (GUI) including a taxability category mappings editor with a selector for collecting client feedback regarding whether the predicted classification is correct. The tax category AI model 16 may be configured to calculate and output a confidence value C regarding the predicted tax category 36. A status S of the approval state indicates whether the tax category is approved, disapproved, or automatically approved. The evaluation module 78 may be configured to automatically approve the confidence value C when it meets or exceeds a predetermined threshold value. As shown in FIG. 7, the confidence value C for the tax category of food being correct for the bagel is 68.13%, and the confidence value C for the tax category of souvenir being correct for the keychain is 52.25%. These values are below the predetermined threshold value, which requires user feedback 80 regarding whether the client approves or disapproves the tax categories 36 for the respective products. As such, the status S for these products indicates that client input is needed. In the provided example, the confidence value C for the tax category of clothing being correct for the shirt is 96.87%, which is above the predetermined threshold value. As such, the status S indicates the tax category is automatically approved. The client's selection to approve or disapprove the tax categories 36 for the bagel and keychain is recorded as user feedback 80. Unless the client explicitly changes an automatically approved status, it will be recorded as granted. As shown in FIG. 7, the tax category of souvenir for the keychain was disapproved. The subsequently approved tax category of automotive supply is reflected in FIG. 8.

Figure 6:
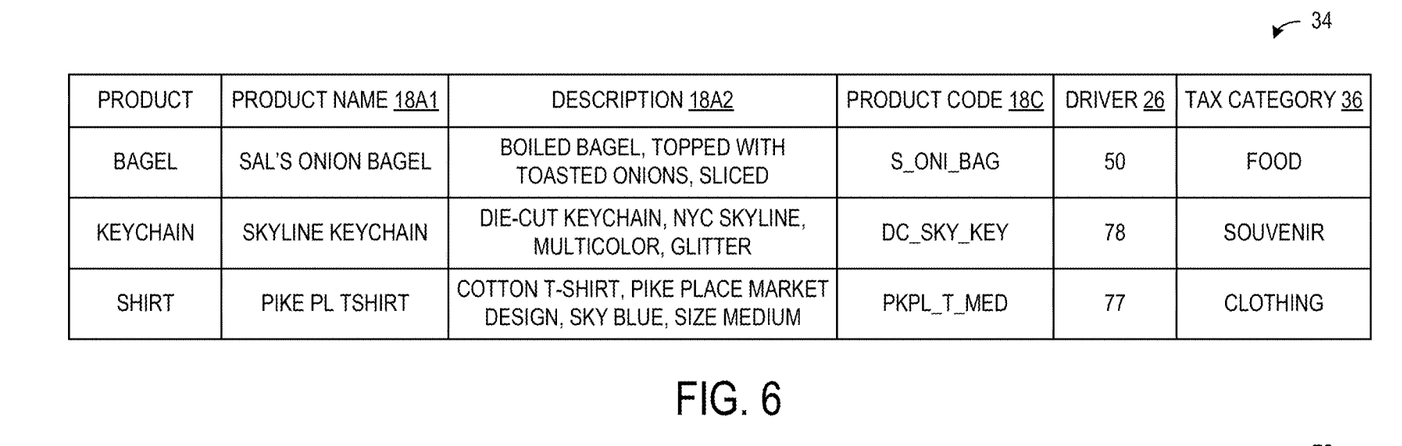
FIG. 6 shows example mappings from the taxability drivers in FIG. 5 to taxability categories.
Figure 8:
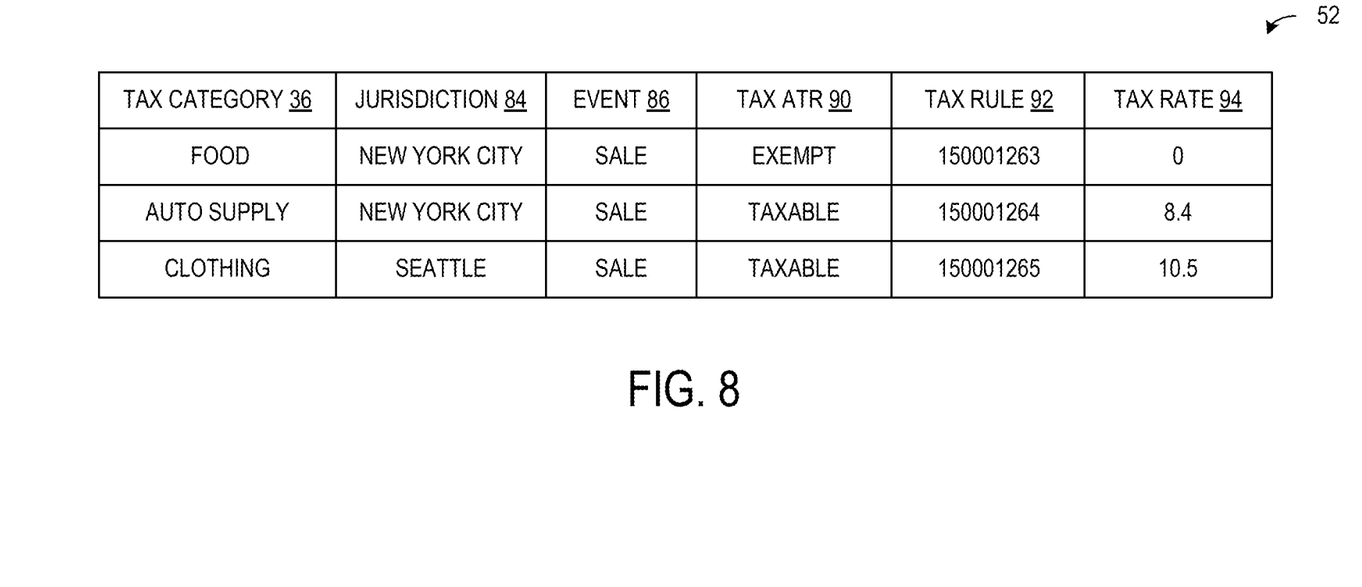
FIG. 8 shows example tax rates and rule data applicable to the products in FIG. 5.

As described above, the taxability driver 26 is received by the transaction tax engine 46, and used to filter the tax rate and rule data 52 based on the tax category 36 to determine an applicable tax rate and/or rule for the transaction. Example tax rates and rule data 52 applicable to the products in FIGS. 5-7 are shown in FIG. 8. The tax rate and rule data 52 include a jurisdiction 84, an event 86, a tax attribute (ATR) 90, a tax rule 92, and an associated tax rate 94. The jurisdiction 84 corresponds to a geographical area where a transaction occurs. The event 86 includes information relating to the nature of the transaction, such as sale, lease, or rental, for example. The tax attribute 90 indicates a taxability status of the tax category 36, such as taxable, nontaxable, and exempt, for example. When the tax attribute 90 is taxable, the tax rule 92 has an associated amount or rate (i.e., fee) which can be an actual rate or fee or can be an indicator that a standard rate of the jurisdiction 84 is to be applied. In the illustrated example, the associated tax rate 94 is expressed as a standard rate of the jurisdiction 84, i.e., a percent of the product price that is to be applied for the total product cost. FIG. 8 shows a portion of the tax rate and rule data 52 for the jurisdictions of New York City and that is stored in the global tax rules database 50.

Figure 9:
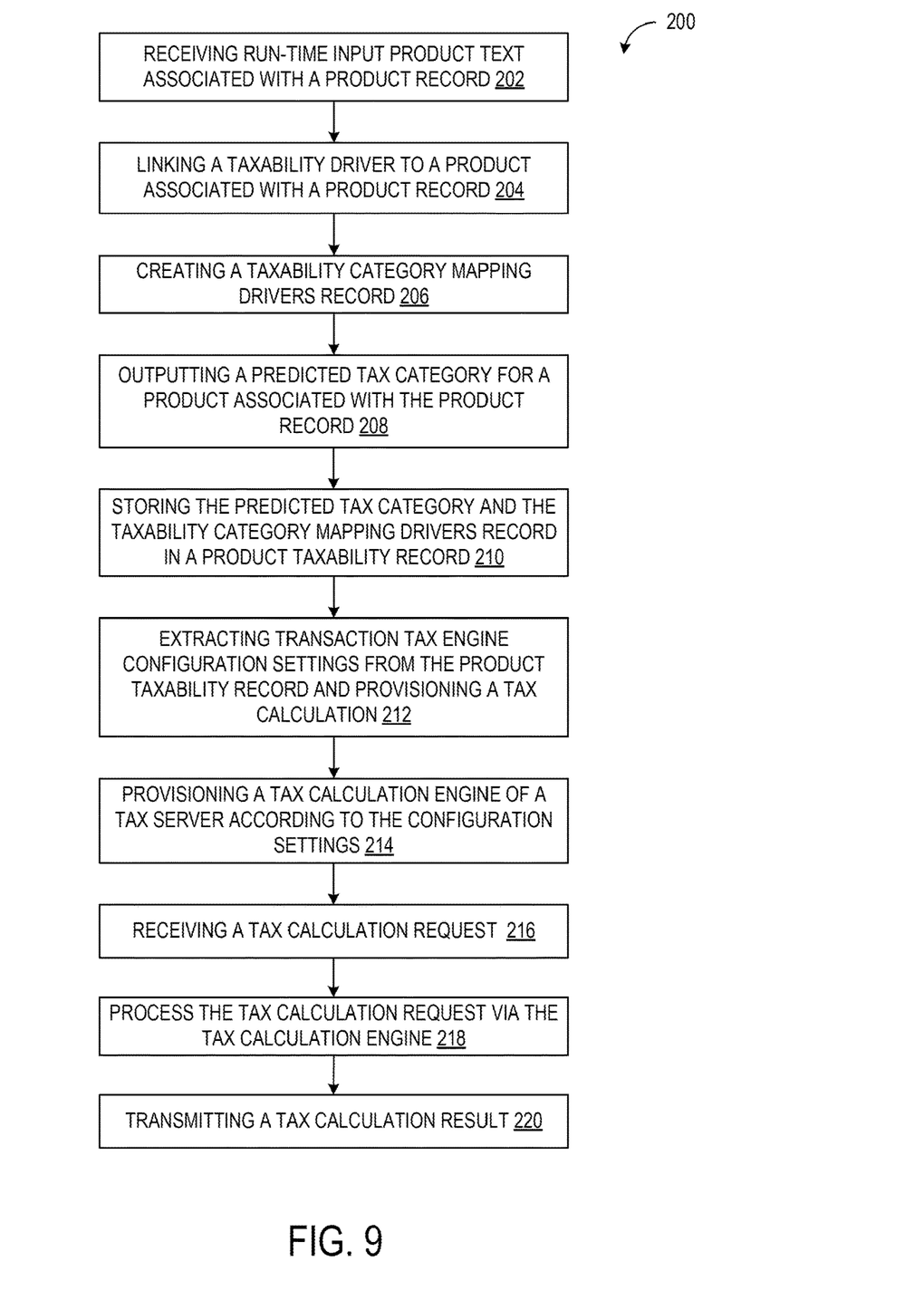
FIG. 9 shows a flow diagram of a method for mapping products to taxability categories according to one example of the present disclosure.

FIG. 9 shows a flow diagram of an example method 200 for mapping products to taxability categories. Method 200 is preferably implemented by one or more processors of a computing device that includes an artificial intelligence model, and that is in communication with a transaction device, such as computing device 10 described herein.

At step 202, the method 200 may include, at one or more processors of a computing system in a run-time inference phase, receiving, as input for an artificial intelligence model, run-time input product text including a product name and product description from a product catalog associated with a product. The method 200 may further include tokenizing, by a tokenizer included in the artificial intelligence model, the product text to thereby produce tokenized text, and receiving, by a neural network included in the artificial intelligence model, the tokenized text. When the neural network is configured as a transformer neural network or a long short-term memory recurrent neural network, the method 200 may further include configuring the transformer neural network as a sequence classifier, receiving a sequence of tokens in the tokenized text, and outputting a classification for the sequence of tokens.

In an initial training phase, the method 200 may include training the artificial intelligence model with a training data set including a plurality of training data pairs, each training data pair including training product text associated with a training product catalog and a ground truth classification indicating a tax category for the product associated with the training product catalog.

Continuing from step 202 to step 204, the method 200 may include linking, by a taxability category mapping engine, a taxability to the product. The method 200 may further include receiving, by the taxability category mapping engine, a product code and taxpayer data from the product catalog associated with the product, the taxpayer data including a taxpayer code and taxpayer partition, and linking the taxability driver to the product based on the product code and taxpayer data.

Proceeding from step 204 to step 206, the method 200 may include creating, by a taxability category driver record association engine, a taxability category mapping drivers record including the taxability driver that is linked to the product.

Advancing from step 206 to step 208, the method 200 may include outputting, by the artificial intelligence model, a predicted tax category for the product. The method 200 may further include displaying, by an evaluation module, the predicted tax category, and receiving a user input indicating that the predicted tax category is correct prior to adopting the predicted tax category for usage in the tax transaction engine.

Continuing from step 208 to step 210, the method 200 may include storing the predicted tax category output from the artificial intelligence model and the taxability category mapping drivers record in a product taxability record. The method 200 may further include, at 212, extracting transaction tax engine configuration settings for a transaction tax engine from the product taxability record, and, at 214, provisioning a tax calculation engine of a tax server according to the configuration settings. The method 200 may further include, at 216, receiving, by the transaction tax engine, a tax calculation request from a transaction device, at 218, processing the tax calculation request according to the configuration settings, and at 220, transmitting a tax calculation response to the transaction device. The tax calculation response may be displayed and/or stored on the transaction device for further processing.

Using the above-described systems and methods, an artificial intelligence model can be trained and executed to predict a tax category for a product from a product catalog uploaded by a client, thereby enabling efficient and accurate tax calculations during a transaction. This model reduces the amount of time and money required for clients to manually map their products to a tax category. Clients are additionally spared the burden of deciphering and updating tax rates and rules in various jurisdictions. Such an architecture also has the advantage that fewer transactions may have an incorrect tax applied, thereby resulting in less tax burden that must be borne by the client due to failure to properly charge tax at the time of the transaction.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
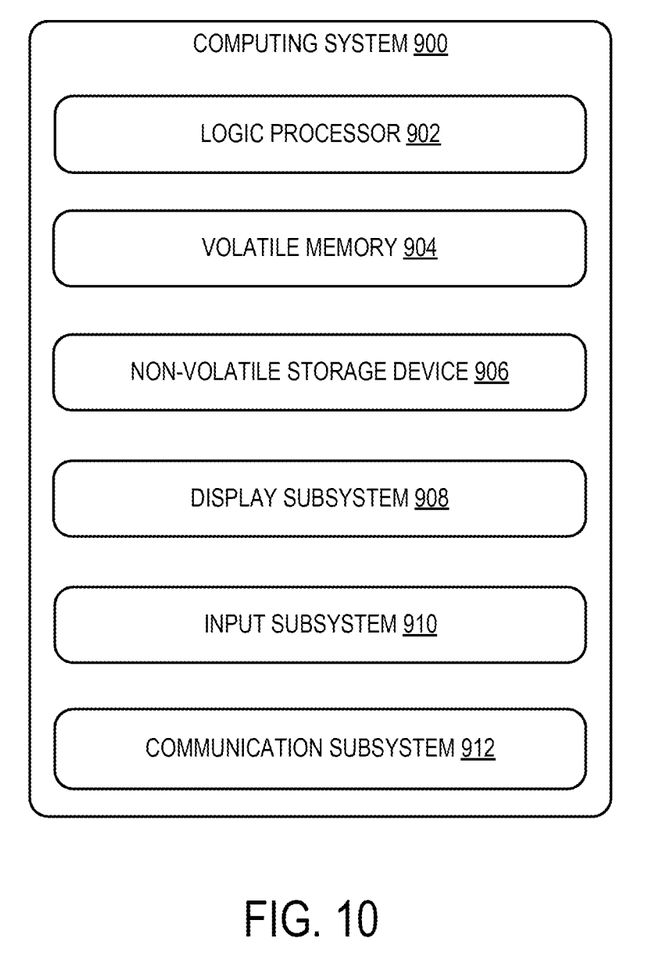
FIG. 10 shows a schematic view of an example computing environment in which the computer system of FIG. 1 may be enacted.

FIG. 10 schematically shows a non-limiting embodiment of a computing system 900 that can enact one or more of the methods and processes described above. Computing system 900 is shown in simplified form. Computing system 900 may embody the computing device 10 described above and illustrated in FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 10.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed, e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for mapping products to taxability categories, comprising:
   a computing device including one or more processors configured to execute instructions using portions of associated memory to implement, in a run-time inference phase:
   an artificial intelligence model configured to receive as run-time input product text including a product name and product description from a product catalog associated with a product, and output a run-time output including a predicted tax category for the product;
   a taxability category mapping engine configured to link a taxability driver to the product; and
   a taxability category driver record association engine configured to create a taxability category mapping drivers record including the taxability driver linked to the product, wherein
   the product catalog includes a product code and taxpayer data related to the product,
   the taxability driver is linked to the product based on the product code and the taxpayer data,
   the predicted tax category output from the artificial intelligence model is displayed in a graphical user interface, and
   the predicted tax category and the taxability category mapping drivers record are stored in a product taxability record.

2. The computing system of claim 1, wherein
the taxpayer data includes a taxpayer code and taxpayer partition.

3. The computing system of claim 1, wherein the one or more processors are further configured to execute:
   an evaluation module configured to display the predicted tax category and to receive a user input indicating that the predicted tax category is correct prior to adopting the predicted tax category for usage in a transaction tax engine.

4. The computing system of claim 1, further comprising:
a transaction tax engine, wherein
transaction tax engine configuration settings for the transaction tax engine are extracted from the product taxability record.

5. The computing system of claim 4, further comprising:
a transaction device, wherein
the transaction tax engine is configured to receive a tax calculation request from the transaction device, process the tax calculation request according to the transaction tax engine configuration settings, and transmit a tax calculation response to the transaction device.

6. The computing system of claim 1, wherein
in an initial training phase, the artificial intelligence model is trained with a training data set including a plurality of training data pairs, each training data pair including training product text associated with a training product catalog and a ground truth classification indicating a tax category for the product associated with the training product catalog.

7. The computing system of claim 1, wherein
the neural network is a long short-term memory recurrent neural network configured as a sequence classifier to receive a sequence of tokens in the tokenized text and output a classification for the sequence of tokens.

8. The computing system of claim 1, wherein
the computing device is configured to:
   collect user feedback via an implicit or explicit user feedback interface, and
   perform feedback training of the artificial intelligence model based at least in part on the user feedback.

9. The computing system of claim 1, wherein
the artificial intelligence model includes a tokenizer that produces tokenized text from the product text, and
the artificial intelligence model further includes a neural network that receives the tokenized text as an input vector, and computes embeddings for the tokenized text.

10. The computing system of claim 9, wherein
the neural network is a transformer neural network configured as a sequence classifier to receive a sequence of tokens in the tokenized text and output a classification for the sequence of tokens.

11. The computing system of claim 10, wherein
the neural network has been pretrained to compute embeddings for the tokenized text via one or more embedding layers.

12. A method for mapping products to taxability categories, the method comprising:
at one or more processors of a computing system, in a run-time inference phase:
receiving, as input for an artificial intelligence model, run-time input product text including a product name and product description from a product catalog associated with a product;
receiving, by a taxability category mapping engine, a product code and taxpayer data from the product catalog associated with the product;
linking, by the taxability category mapping engine, a taxability driver to the product, based on the product code and taxpayer data;
creating, by a taxability category driver record association engine, a taxability category mapping drivers record including the taxability driver that is linked to the product;
outputting, by the artificial intelligence model, a predicted tax category for the product;
displaying, in a graphical user interface, the predicted tax category output from the artificial intelligence model; and
storing the predicted tax category output from the artificial intelligence model and the taxability category mapping drivers record in a product taxability record.

13. The method of claim 12, wherein the taxpayer data includes a taxpayer code and taxpayer partition.

14. The method of claim 12, the method further comprising:
displaying, by an evaluation module, the predicted tax category; and
receiving a user input indicating that the predicted tax category is correct prior to adopting the predicted tax category for usage in a transaction tax engine.

15. The method of claim 12, the method further comprising:
extracting transaction tax engine configuration settings for a transaction tax engine from the product taxability record.

16. The method of claim 15, the method further comprising:
receiving, by the transaction tax engine, a tax calculation request from a transaction device;
processing the tax calculation request according to the transaction tax engine configuration settings; and
transmitting a tax calculation response to the transaction device.

17. The method of claim 12, the method further comprising:
in an initial training phase, training the artificial intelligence model with a training data set including a plurality of training data pairs, each training data pair including training product text associated with a training product catalog and a ground truth classification indicating a tax category for the product associated with the training product catalog.

18. The method of claim 12, wherein the neural network is configured as a long short-term memory recurrent neural network, the method further comprising:
configuring the long-short term memory recurrent neural network as a sequence classifier;
receiving a sequence of tokens in the tokenized text; and
outputting a classification for the sequence of tokens.

19. The method of claim 12, the method further comprising:
tokenizing, by a tokenizer included in the artificial intelligence model, the product text to produce tokenized text; and
receiving, by a neural network included in the artificial intelligence model, the tokenized text as an input vector.

20. The method of claim 19, wherein the neural network is configured as a transformer neural network, the method further comprising:
configuring the transformer neural network as a sequence classifier;
receiving a sequence of tokens in the tokenized text; and
outputting a classification for the sequence of tokens.

* * * * *